(12) United States Patent
Forrer, Jr. et al.

(10) Patent No.: US 7,836,247 B2
(45) Date of Patent: Nov. 16, 2010

(54) METHOD, APPARATUS, AND COMPUTER PROGRAM PRODUCT FOR PERMITTING ACCESS TO A STORAGE DRIVE WHILE THE DRIVE IS BEING FORMATTED

(75) Inventors: Thomas R. Forrer, Jr., Round Rock, TX (US); Jason Eric Moore, Austin, TX (US); Abel Enrique Zuzuarregui, Paige, TX (US)

(73) Assignee: International Business Machines Corporation, Armonk, NY (US)

( * ) Notice: Subject to any disclaimer, the term of this patent is extended or adjusted under 35 U.S.C. 154(b) by 1058 days.

(21) Appl. No.: 11/016,216

(22) Filed: Dec. 17, 2004

(65) Prior Publication Data

US 2006/0136662 A1    Jun. 22, 2006

(51) Int. Cl.
G06F 12/00 (2006.01)
G06F 13/00 (2006.01)
G06F 13/28 (2006.01)

(52) U.S. Cl. .................................................... 711/112
(58) Field of Classification Search ....................... None
See application file for complete search history.

(56) References Cited

U.S. PATENT DOCUMENTS

| 3,599,178 | A | * | 8/1971 | Jackson et al. ................. 711/4 |
| 4,498,146 | A | * | 2/1985 | Martinez ..................... 711/115 |
| 5,627,946 | A | * | 5/1997 | Strang, Jr. ................ 360/77.08 |
| 6,038,636 | A | * | 3/2000 | Brown et al. ................ 711/103 |
| 6,097,683 | A | * | 8/2000 | Ohara et al. ............. 369/53.22 |
| 6,567,887 | B2 | * | 5/2003 | Harmer ...................... 711/112 |
| 6,697,881 | B2 | * | 2/2004 | Cochran ........................ 710/5 |
| 6,778,974 | B2 | * | 8/2004 | Moore et al. ................... 707/1 |
| 2002/0107862 | A1 | * | 8/2002 | Moore et al. ................ 707/101 |
| 2002/0144070 | A1 | * | 10/2002 | Watanabe et al. ........... 711/165 |
| 2003/0088745 | A1 | * | 5/2003 | Okada ........................ 711/159 |
| 2005/0289261 | A1 | * | 12/2005 | White et al. .................. 710/74 |

* cited by examiner

*Primary Examiner*—Kevin L Ellis
*Assistant Examiner*—Gary W. Cygiel
(74) *Attorney, Agent, or Firm*—Yee & Associates, P.C.; Diana R. Gerhardt

(57) ABSTRACT

A method, apparatus, and computer program product are disclosed for permitting access to a data storage device while the device is being formatted. A format command is received within the device from the host. A command complete response is then transmitted to the host before the device has completed being formatted. The host waits for the command complete response before the host transmits any read or write command to the device. Read and write commands that are transmitted to the device from the host are executed while the device is still being formatted.

16 Claims, 4 Drawing Sheets

METHOD, APPARATUS, AND COMPUTER PROGRAM PRODUCT FOR PERMITTING ACCESS TO A STORAGE DRIVE WHILE THE DRIVE IS BEING FORMATTED

BACKGROUND OF THE INVENTION

1. Technical Field

The present invention is directed to data processing systems. More specifically, the present invention is directed to a method, apparatus, and computer program product for permitting access to a storage drive while the drive is being formatted.

2. Description of Related Art

Hard drive capacities have been doubling approximately every 18 months. As a result, the time it takes to format a hard drive has also been increasing. For example, for a SCSI disk drive that is capable of storing 300 Gbytes, it takes approximately 105 minutes to format the drive.

A disk drive is accessed using a logical block address (LBA). The drive is divided into multiple different LBAs. The smallest unit in a disk drive that can be accessed by a user application is an LBA. An LBA identifies a particular cylinder, head, and sector location within the drive.

In order to format a disk drive, a host that is coupled to the disk drive will send a FORMAT UNIT command to the disk drive. A disk drive controller, included within the disk drive, then receives this FORMAT UNIT command. The disk drive controller executes the FORMAT UNIT command by identifying bad logical block addresses (LBAs) within the drive, building a track layout table that indicates which LBAs are bad and thus are to be skipped, and writing an initialization pattern to the good LBAs in the drive. While the disk controller is in the process of formatting the drive, the host cannot access the drive to read data from or write data to the drive.

Once the disk controller has completed formatting the drive, the controller then indicates to the host that it has finished. The disk controller indicates to the host that it has finished formatting the drive by returning a COMMAND COMPLETE response to the host. Once the host receives the COMMAND COMPLETE response, the host can then begin accessing the drive to read and/or write data to the drive. Because the format operation can take a very long time, the drive is unavailable for this long period of time.

Therefore, a need exists for a method, apparatus, and computer program product for permitting access to a storage drive, such as a hard disk drive, while the drive is being formatted.

SUMMARY OF THE INVENTION

A method, apparatus, and computer program product are disclosed for permitting access to a data storage device while the device is being formatted. A format command is received within the device from the host. A command complete response is then sent to the host before the device has completed being formatted. The host waits for the command complete response before the host sends any read or write command to the device. Read and write commands that are sent to the device from the host are executed while the device is still being formatted.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
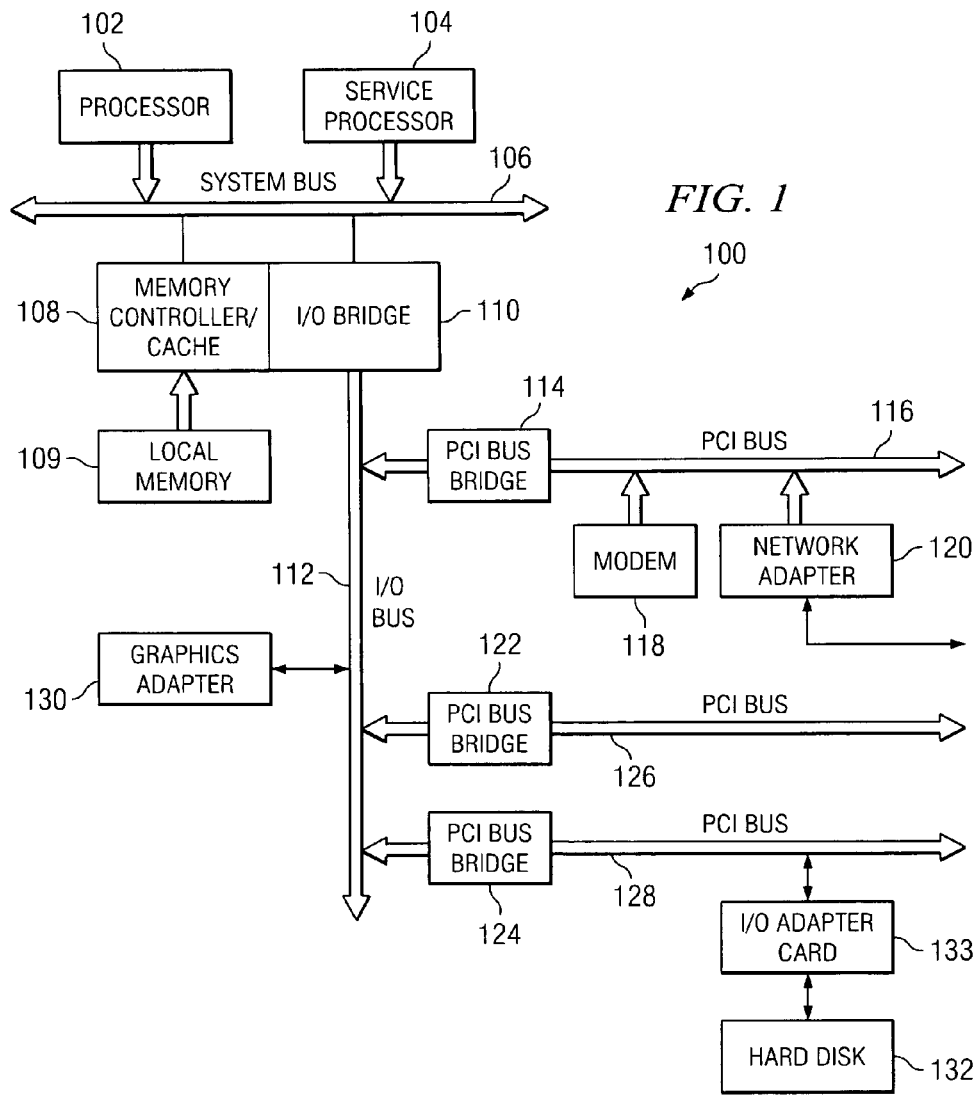
FIG. 1 is a block diagram of a computer system that includes a storage drive, such as a hard disk drive, that includes the present invention in accordance with the present invention.

A preferred embodiment of the present invention and its advantages are better understood by referring to the figures, like numerals being used for like and corresponding parts of the accompanying figures.

A method, apparatus, and computer program product are disclosed for permitting access to a data storage device while the device is being formatted. The data storage device is preferably a hard disk drive although other types of block storage devices that include blocks that are capable of being individually and separately accessed may be used.

A host is coupled to the drive. The host sends commands such as read commands, write commands, and format commands to the drive to be executed by the drive. When the host sends a FORMAT UNIT command to the drive, the host waits until it receives a COMMAND COMPLETE response from the drive before the host transmits any further read and/or write commands to the drive. Thus, the host cannot perform any useful work with the drive between the time the host transmits a FORMAT UNIT command and the time the host receives a COMMAND COMPLETE response from the drive.

According to the prior art, the drive did not send a COMMAND COMPLETE response until the drive had completed the format process. Thus, in prior art systems, the host was not permitted to access the drive to have the drive perform reads and/or writes while the drive was being formatted.

According to the present invention, the host is permitted to access the drive to have the drive perform reads and/or writes while the drive is being formatted.

According to the present invention, the drive will return a COMMAND COMPLETE response to the host before the drive is completely formatted. Once the host receives this COMMAND COMPLETE response, the host can then start sending read and write commands to the drive. Read and write commands that are sent to the drive from the host are executed while the drive is still being formatted.

The drive includes a disk drive controller that executes the process of the present invention. After the disk drive controller receives a FORMAT UNIT command, the controller performs an abbreviated initialization process in the drive by reading the P and G lists of defective LBAs and then building a track layout table. At this time, prior to beginning writing any initialization data pattern to the drive media, the controller will return the COMMAND COMPLETE response to the host. Once the host receives the COMMAND COMPLETE response, the host may then begin sending read and/or write commands to the drive that the drive will process even while it is being formatted.

The drive processes read and/or write commands from the host while the drive is being formatted. The controller maintains a write table that tracks which LBAs have been initialized and which LBAs contain real data that is other than the initialization data. The real data is data that has been written to an LBA after the drive received the FORMAT UNIT command that it is processing.

When the drive receives a read command while the drive is being formatted, the controller accesses the write table to determine whether the LBA identified by the read command to be read has already been initialized. If the LBA has already been initialized, the controller will return whatever data is currently stored in the LBA. If the LBA has not already been initialized, the controller will return the initialization data regardless of whatever data might be stored in the LBA.

When the drive receives a write command while the drive is being formatted, the controller accesses the write table to determine whether the LBA identified by the write command to be written to has already been initialized. If the LBA has already been initialized, the controller will write the data that is included in the write command to the LBA. Thus, the LBA will now include real data. If the LBA has not already been initialized, the controller will store an indication in the write table and then write the data that is included in the write command to the LBA. This indication will indicate that this LBA has real data stored within it.

Concurrently as the read and/or write process described above is executing, the controller is also executing the FORMAT UNIT command to format the drive media. When the controller is formatting the drive media, the controller will write a fixed initialization data pattern to the LBAs in the media. For each non-defective LBA, the controller will determine whether the write table indicates that the LBA has already been initialized or contains real data. If the write table indicates that the LBA has already been initialized or that real data has already been written to this LBA, the controller will not write the initialization data pattern to this LBA and will then go to the next LBA to be initialized. If the write table indicates that the LBA has not already been initialized and does not contain real data, the controller will write the initialization data pattern to the LBA and will store an indication in the write table that this LBA has been initialized.

FIG. 1 is a block diagram of a computer system that includes a storage drive, such as a hard disk drive, that includes the present invention in accordance with the present invention. Data processing system 100 may be a symmetric multiprocessor (SMP) system including a plurality of processors 102 and 104 connected to system bus 106. Alternatively, a single processor system may be employed. In the depicted example, processor 104 is a service processor. Also connected to system bus 106 is memory controller/cache 108, which provides an interface to local memory 109. I/O bus bridge 110 is connected to system bus 106 and provides an interface to I/O bus 112. Memory controller/cache 108 and I/O bus bridge 110 may be integrated as depicted.

Peripheral component interconnect (PCI) bus bridge 114 connected to I/O bus 112 provides an interface to PCI local bus 116. A number of modems may be connected to PCI bus 116. Typical PCI bus implementations will support four PCI expansion slots or add-in connectors. Communications links to other computers may be provided through modem 118 and network adapter 120 connected to PCI local bus 116 through add-in boards.

Additional PCI bus bridges 122 and 124 provide interfaces for additional PCI buses 126 and 128, from which additional modems or network adapters may be supported. In this manner, data processing system 100 allows connections to multiple network computers. A memory-mapped graphics adapter 130 may also be connected to I/O bus 112 as depicted, either directly or indirectly.

A storage device, such as hard drive 132 is coupled to a PCI bus, such as bus 128, via an I/O adapter card 133. Hard drive 132 may be implemented using any type of technology. For example, hard drive 132 may be a SAS drive or may be a SCSI drive. Adapter card 133 then maps PCI bus as either a SCSI bus or SAS bus depending on the type of interface technology supported by the hard drive 132.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the present invention.

Figure 2:
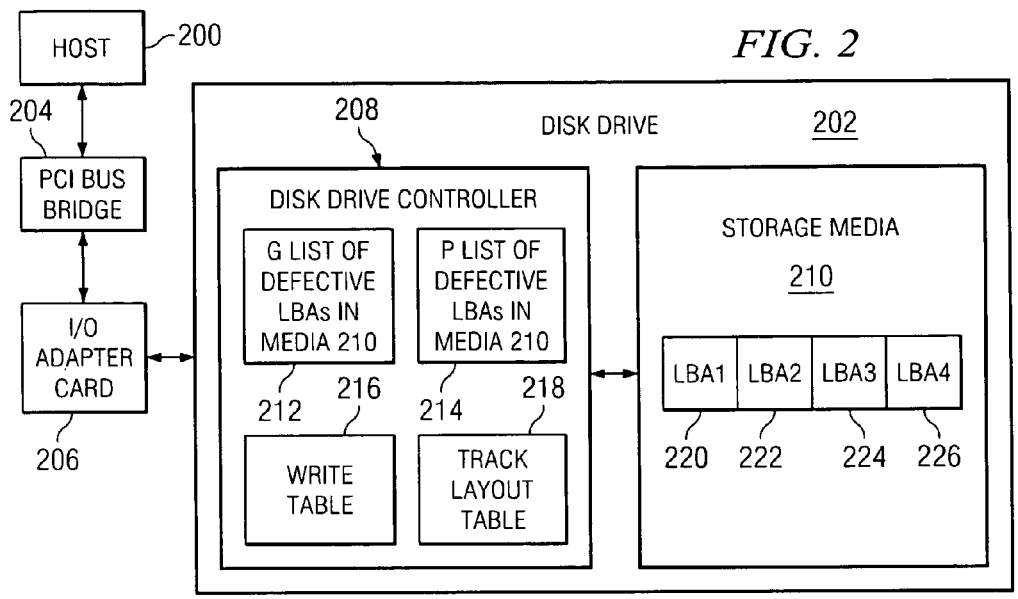
FIG. 2 is a block diagram of a disk drive that is coupled to a host computer where the disk drive includes the present invention in accordance with the present invention.

FIG. 2 is a block diagram of a host 200 that is coupled to a storage device, such as hard disk drive 202, that implements the present invention. Host 200 is coupled to a bridge, such as PCI bus bridge 204. PCI bus bridge 204 is coupled to disk drive 202 through an input/output (I/O) adapter card 206.

Disk drive 202 includes a disk drive controller 208 that is coupled to storage media 210. In a hard disk drive, storage media 210 will be the actual magnetically coated hard disks.

Disk drive controller 208 includes a processor and other devices that are not shown which execute commands received from host 200 to access storage media 210 and to perform control operations. Control operations include formatting storage media 210 and other processes such as, for example, responding to a request for a partition table that controller 208 may maintain.

Disk drive controller 208 is responsible for executing commands received from host 200 including executing FORMAT UNIT commands and then generating a COMMAND COMPLETE response.

Disk drive controller 208 includes lists of defective LBAs, such as a G list 212 of defective LBAs in media 210, and a P list 214 of defective LBAs in media 210. Disk drive controller 208 also includes a write table 216 and a track layout table 218.

G list 212, P list 214, and track layout table 218 operate in a manner according to the prior art.

Write table 216 is provided according to the present invention to enable controller 208 to track to which LBAs an initialization data pattern has already been written during a FORMAT UNIT process. During the formatting process, disk drive controller 208 will attempt to write an initialization data pattern to good LBAs within storage media 210. After disk drive controller 208 has written an initialization pattern to a particular LBA, disk drive controller 208 will store an indication in write table 216 to indicate that this particular LBA has been initialized. Thus, write table 216 will include a list of LBAs to which the initialization pattern has been written and, therefore, are initialized.

In addition, as will be described in more detail below, instead of writing an initialization data pattern to an LBA, disk drive controller 208 may store actual data in a particular LBA. Write table 216 will also include a list of LBAs to which real data has been written.

Storage media 210 includes a plurality of individually addressable LBAs, such as for example LBA 1 220, LBA 2 222, LBA 3 224, and LBA 4 226. During the formatting process, a determination is made as to whether any of the LBAs are defective. An indication is stored in either G list 212 or P list 214 that identifies each bad LBA.

Figure 3:
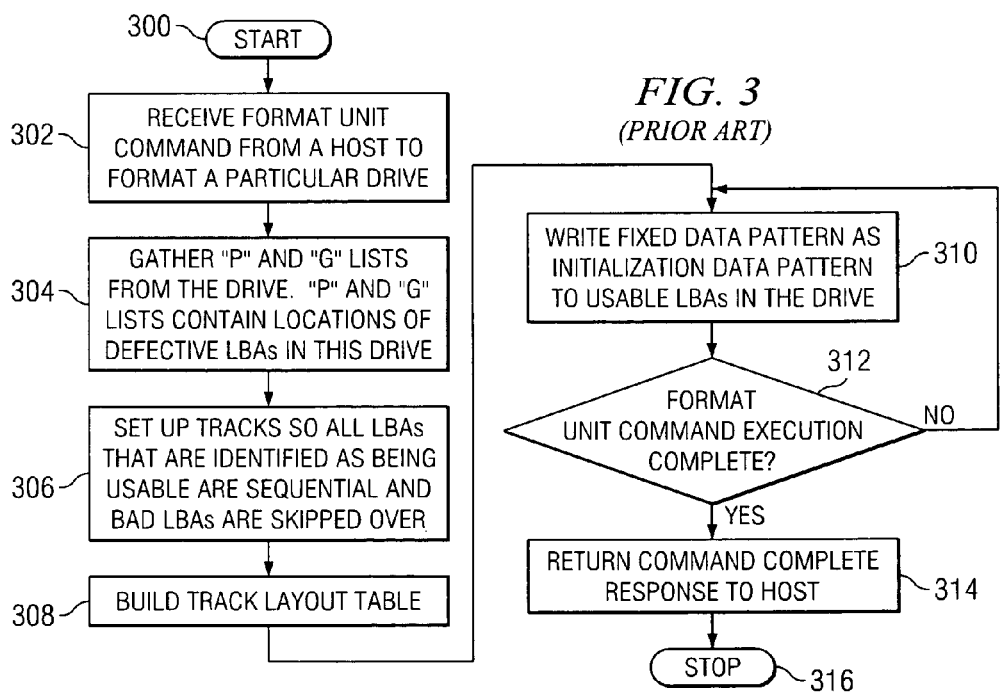
FIG. 3 illustrates a high level flow chart that depicts a disk controller executing a FORMAT UNIT command in accordance with the prior art.

FIG. 3 illustrates a high level flow chart that depicts a disk drive controller executing a FORMAT UNIT command in accordance with the prior art. The process starts as depicted by block 300 and thereafter passes to block 302 which illustrates receiving within a storage drive controller a FORMAT UNIT command from a host to format that drive. At this time, host 200 cannot read from or write to drive 202. Next, block 304 depicts the controller gathering the "P" and "G" lists from this drive. The "P" and "G" lists contain the locations of the defective LBAs in this drive.

The process then passes to block 306 which illustrates the controller setting up the tracks in the drive so that all LBAs that are identified as being usable are sequential and bad LBAs are skipped over. Thereafter, block 308 depicts the controller building a track layout table. Next, block 310 illustrates the controller writing a fixed data pattern as an initialization pattern to usable LBAs in the drive.

The process then passes to block 312 which depicts a determination by the controller of whether or not the controller has completed the execution of the FORMAT UNIT command. If a determination is made that controller has not finished executing the FORMAT UNIT command, the process passes to block 310. Referring again to block 312, if a determination is made that the controller has finished executing the FORMAT UNIT command, the process passes to block 314 which illustrates the controller returning a COMMAND COMPLETE response to the host. At this point, the controller has completed the format process. Once the host receives the COMMAND COMPLETE response, the host may once again resume accessing drive 202. Drive 202 is now formatted, and host 200 can once again access drive 202 to read data from or write data to drive 202. The process then terminates as depicted by block 316.

Figure 4A:
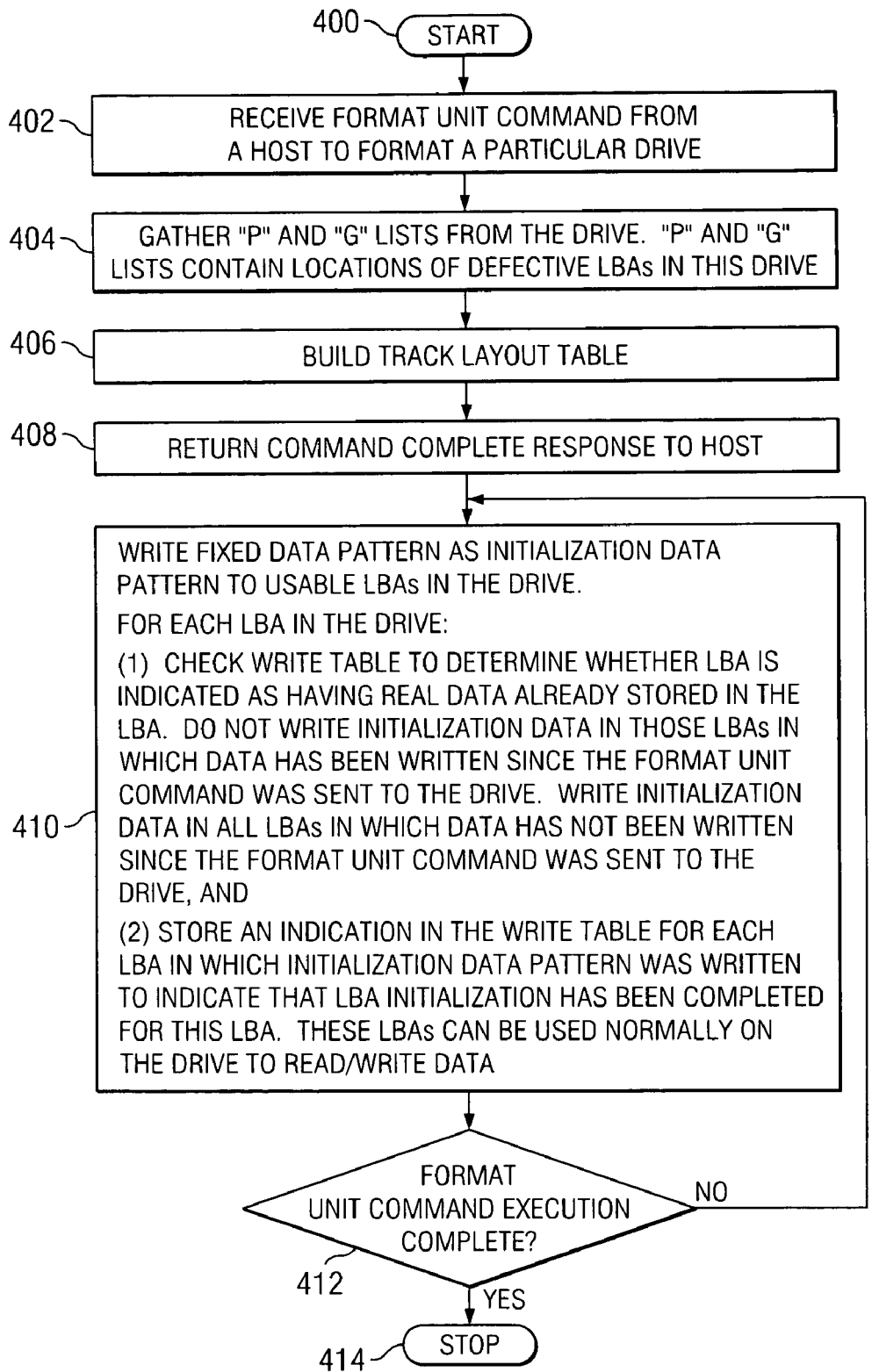
FIG. 4A depicts a high level flow chart that illustrates a disk controller in a disk drive executing a FORMAT UNIT command in accordance with the present invention.

FIG. 4A depicts a high level flow chart that illustrates a disk controller within a drive executing a FORMAT UNIT command in accordance with the present invention. The process starts as depicted by block 400 and thereafter passes to block 402 which illustrates the controller receiving a FORMAT UNIT command from a host to format the drive's media. Next, block 404 depicts the controller gathering the "P" and "G" lists from this drive. The "P" and "G" lists contain the locations of the defective LBAs in this drive.

The process then passes to block 406 which illustrates the controller setting up the tracks in the drive so that all LBAs identified as being usable are sequential and bad logical block addresses (LBAs) are skipped over. Thereafter, block 408 depicts the controller returning a COMMAND COMPLETE response to the host. This indicates to the host that the controller has finished executing the FORMAT UNIT command. At this point, the host believes the drive has been formatted although the controller has not actually completed the format process. At this time, the controller is still in the process of executing the FORMAT UNIT command. Once the host receives the COMMAND COMPLETE response, the host may once again resume accessing the drive.

Next, block 410 illustrates the controller writing a fixed data pattern as an initialization data pattern to the usable LBAs in the drive. For each LBA in the drive, a write table is checked to determine whether the LBA is indicated as having real data that is already stored in the LBA. An indication is stored in the write table for each LBA that includes real data. Real data is defined as being data that has been written since the FORMAT UNIT command was received by the disk controller. The initialization data pattern is not real data. Initialization data is not written to the LBAs in which real data has been written since the FORMAT UNIT command was sent to the drive. Initialization data is written in all LBAs in which data has not been written since the FORMAT UNIT command was sent to the drive. Thus, if an LBA does not include real data that was written to it since the FORMAT UNIT command was received, the LBA will be initialized by writing the initialization pattern to the LBA.

In addition, an indication is stored in the write table for each LBA to which initialization data was written to indicate that the initialization has been completed for this LBA. The LBAs to which the initialization pattern has been written and for which an indication has been stored in the write table indicating that the initialization pattern has been written can now be used normally on the drive to read and/or write data. In this manner, the write table includes an indication for each LBA in which initialization data has been written since the FORMAT UNIT command was received.

The process then passes to block 412 which depicts a determination of whether or not the controller has finished executing the FORMAT UNIT command. The controller will be finished executing the FORMAT UNIT command when the controller has written the initialization data pattern to all non-defective LBAs that do not already have real data written to the LBA. Thus, when the FORMAT UNIT command is complete, each non-defective LBA will store either real data or the initialization pattern data.

If a determination is made that the controller has not finished executing the FORMAT UNIT command, the process passes back to block 410. Referring again to block 412, if a determination is made that controller has finished executing the FORMAT UNIT command, the process terminates as illustrated by block 414.

Figure 4B:
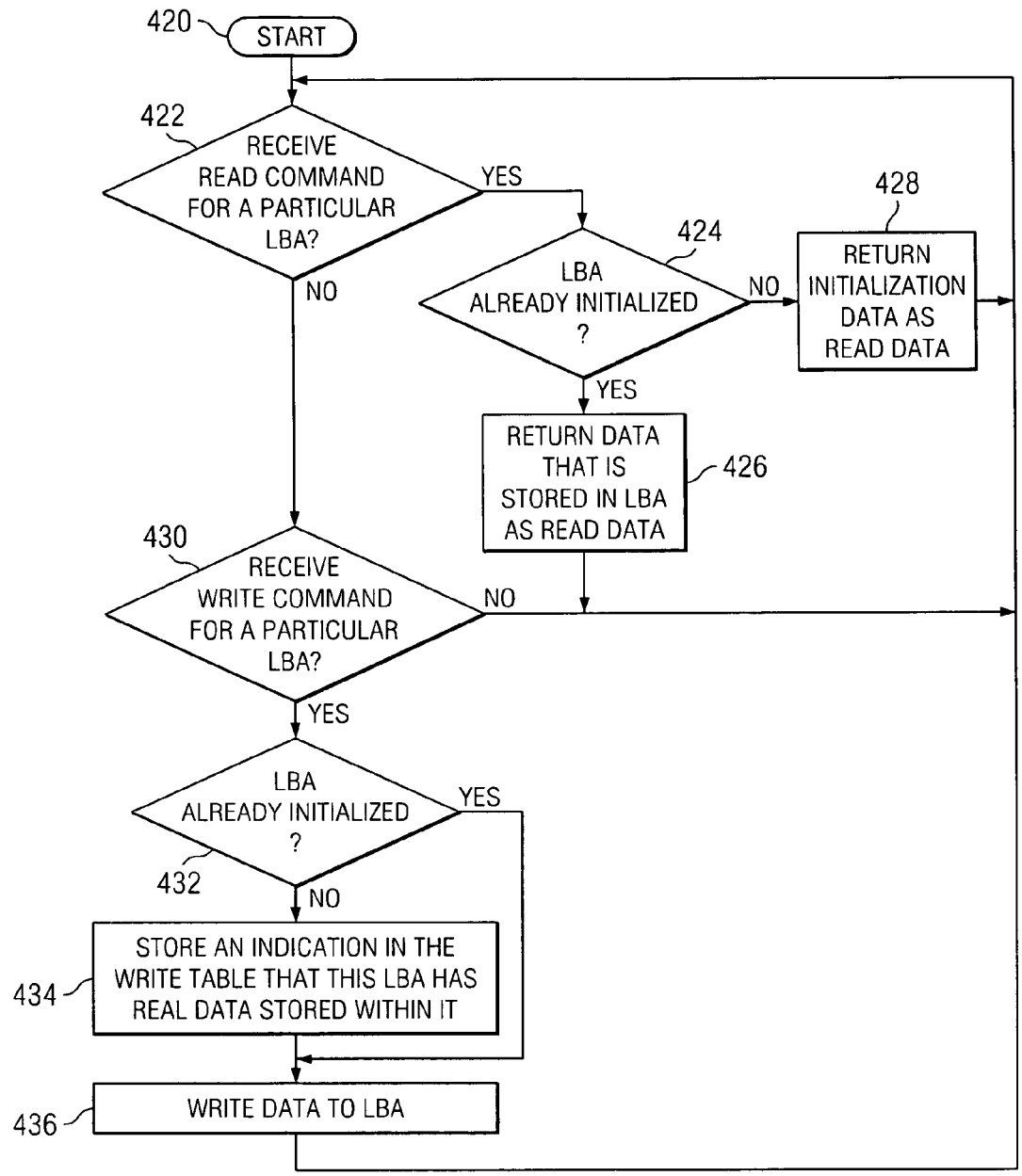
FIG. 4B illustrates a high level flow chart to read or write data to the disk drive of FIG. 4A that can execute in parallel with the process of FIG. 4A in accordance with the present invention.

FIG. 4B illustrates a high level flow chart that can execute in parallel with the process of FIG. 4A in accordance with the present invention. FIG. 4B depicts reading data from or writing data to the disk drive of FIG. 4A in accordance with the present invention. The process depicted by FIG. 4B can take place in parallel with the process depicted by FIG. 4A. Thus, the reading and/or writing to the disk drive can take place simultaneously as the disk drive is being formatted by the drive controller.

The process starts as depicted by block 420 and thereafter passes to block 422 which illustrates a determination of whether or not a READ command has been received by the controller to read a particular LBA within the drive. If a determination is made that the controller has received a READ command to read a particular LBA within the drive, the process passes to block 424 which illustrates a determination of whether or not this particular LBA has already been initialized. This determination is made by accessing the write table to determine if the initialization has been completed for this LBA.

If a determination is made that this particular LBA has been initialized, the process passes to block 426 which depicts returning the data that is stored in the particular LBA as the read data for the READ command. The process then passes to block 422. Referring again to block 424, if a determination is made that this particular LBA has not been initialized, the process passes to block 428 which depicts returning the initialization data as the read data for the READ command. The initialization pattern data is returned even though the initialization pattern data has not yet been written to this particular LBA. The process then passes to block 422.

Referring again to block 422, if a determination is made that the controller has not received a READ command to read a particular LBA within the drive, the process passes to block 430 which illustrates a determination of whether or not the controller has received a WRITE command to write particular data to a particular LBA within the drive. This particular data to be written to the LBA has been referred to above as "real data". If a determination is made that the controller has received a WRITE command to write particular data to a particular LBA within the drive, the process passes to block 432.

Block 432 depicts a determination of whether or not this particular LBA has already been initialized. This determination is made using the write table in the controller. If a determination is made that this particular LBA has been initialized, the process passes to block 436 which depicts the controller executing the WRITE command by writing the particular data, the data that was included in the WRITE command, to the particular LBA. The process then passes to block 422. Referring again to block 432, if a determination is made that this particular LBA has not been initialized, the process passes to block 434 which depicts storing an indication in the write table that this LBA has real data stored within it. Thus, the indication indicates that the initialization data is not stored in the particular LBA. The process then passes to block 436.

It is important to note that while the present invention has been described in the context of a fully functioning data processing system. Those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, and DVD-ROMs. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a hard disk drive, which includes a disk drive controller and physical storage media, for permitting access to said hard disk drive while said storage media is being formatted, a plurality of logical block addresses being stored in said storage media, said plurality of logical block addresses including a plurality of usable logical block addresses and a plurality of defective logical block addresses, said method comprising:

receiving, by said disk drive controller from a host, a format command to execute a format process to format said storage media;

reading, by said disk drive controller, a list of said plurality of defective logical block addresses, said list of said plurality of defective logical block addresses being stored within said disk drive controller;

building, by said disk drive controller, a track layout table that makes said plurality of usable logical block addresses sequential and skips over said plurality of defective logical block addresses, said track layout table being stored within said disk drive controller;

after said track layout table has been built, returning, by said disk drive controller, a command complete response to said host before said format process has been completed and before said storage media has been formatted, said host waiting for said command complete response before said host transmits any read or write command to said hard disk drive;

for each one of said plurality of usable logical block addresses, and for none of said plurality of defective logical block addresses:
  storing, within a write table that is stored in said disk drive controller, a first indicator that indicates whether or not said usable logical block address includes real data, real data being data that was written to said usable logical block address after said format process started executing and before said format process has been completed; and
  storing, within said write table, a second indicator that indicates whether or not said usable logical block address has been formatted, said usable logical block address being formatted when initialization data is written to said usable logical block address;

first ones of said plurality of usable logical block addresses having a first indicator that indicates that said first ones of said plurality of usable logical block addresses include real data and a second indicator that indicates that said first ones of said plurality of usable logical block addresses have not been formatted, wherein said first ones of said plurality of usable logical block addresses include real data and have not been formatted; and using, by said disk drive controller, said write table to execute read and write commands transmitted to said hard disk drive from said host while said storage media is being formatted.

2. The method according to claim 1, further comprising:

in response to receiving said format command, executing said format process by storing said initialization data in second ones of said plurality of usable logical block addresses that do not include real data and have not been initialized; and after storing said initialization data in said second ones of said plurality of usable logical block addresses, updating said second indicator for each one of said second ones of said plurality of usable logical block addresses to indicate that each one of said second ones of said plurality of usable logical block addresses has been formatted.

3. The method according to claim 2, further comprising:

while executing said format process, receiving a command to read a particular one of said plurality of usable logical block addresses;

determining whether said particular one of said plurality of usable logical block addresses has been formatted;

in response to determining that said particular one of said plurality of usable logical block addresses has been formatted, reading data from said particular one of said plurality of usable logical block addresses to return as a response to said read command; and in response to determining that said particular one of said plurality of usable logical block addresses has not been formatted, returning said initialization data as a response to said read command.

4. The method according to claim 3, further comprising:
determining whether said particular one of said plurality of usable logical block addresses has been formatted by reading said second indicator stored for said particular one of said plurality of usable logical block addresses.

5. The method according to claim 2, further comprising:
while executing said format process, receiving a command to write particular data to a particular one of said plurality of usable logical block addresses;
determining whether said particular one of said plurality of usable logical block addresses has been formatted;
in response to determining that said particular one of said plurality of usable logical block addresses has been formatted, writing said particular data to said particular one of said plurality of usable logical block addresses; and
in response to determining that said particular one of said plurality of usable logical block addresses has not been formatted, writing said particular data to said particular one of said plurality of usable logical block addresses and updating said first indicator to indicate that said particular one of said plurality of usable logical block addresses includes real data, said second indicator for said particular one of said plurality of usable logical block addresses indicating that said particular one of said plurality of usable logical block address has not been formatted.

6. The method according to claim 1, further comprising:
analyzing a next one of said plurality of usable logical block addresses to be formatted;
using said second indicator to determine whether said next one of said plurality of usable logical block addresses has already been formatted;
in response to determining that said next one of said plurality of usable logical block addresses has not already been formatted, using said first indicator to determine whether real data has been stored in said next one of said plurality of usable logical block addresses;
in response to determining that said next one of said plurality of usable logical block addresses has not already been formatted and does not include real data, writing said initialization data to said next one of said plurality of usable logical block addresses; and
in response to determining that said next one of said plurality of usable logical block addresses has either already been formatted or does include real data, skipping said next one of said plurality of usable logical block addresses without writing said initialization data to said next one of said plurality of usable logical block addresses.

7. An apparatus in a hard disk drive, which includes a disk drive controller and physical storage media, for permitting access to said hard disk drive while said storage media is being formatted, said apparatus comprising:
a plurality of logical block addresses stored in said storage media, said plurality of logical block addresses including a plurality of usable logical block addresses and a plurality of defective logical block addresses;
said disk drive controller receiving a format command from a host to execute a format process to format said storage media;
said disk drive controller reading a list of said plurality of defective logical block addresses, said list of said plurality of defective logical block addresses being stored within said disk drive controller;
said disk drive controller building a track layout table that makes said plurality of usable logical block addresses sequential and skips over said plurality of defective logical block addresses, said track layout table being stored within said disk drive controller;
after said track layout table has been built, said disk drive controller returning a command complete response to said host before said format process has been completed and before said storage media has been formatted, said host waiting for said command complete response before said host transmits any read or write command to said hard disk drive;
a write table, which is stored in said disk drive controller, for storing a first indicator and a second indicator for each one of said plurality of usable logical block addresses;
for each one of said plurality of usable logical block addresses, and for none of said plurality of defective logical block addresses:
said first indicator for indicating whether or not said usable logical block address includes real data, real data being data that was written to said usable logical block address after said format process started executing and before said format process has been completed; and
said second indicator for indicating whether or not said usable logical block address has been formatted, said usable logical block address being formatted when initialization data is written to said usable logical block address;
first ones of said plurality of usable logical block addresses having a first indicator that indicates that said first ones of said plurality of usable logical block addresses include real data and a second indicator that indicates that said first ones of said plurality of usable logical block addresses have not been formatted, wherein said first ones of said plurality of usable logical block addresses include real data and have not been formatted; and
said disk drive controller using said write table to execute read and write commands transmitted to said hard disk drive from said host while said storage media is being formatted.

8. The apparatus according to claim 7, further comprising:
in response to receiving said format command, said format process being executed by storing said initialization data in second ones of said plurality of usable logical block addresses of said hard disk drive that do not include real data and have not been initialized; and
after storing said initialization data in said second ones of said plurality of usable logical block addresses, said second indicator being updated for each one of said second ones of said plurality of usable logical block addresses to indicate that each one of said second ones of said plurality of usable logical block addresses has been formatted.

9. The apparatus according to claim 8, further comprising:
while executing said format process, said disk drive controller receiving a command to read a particular one of said plurality of usable logical block addresses;
said disk drive controller determining whether said particular one of said plurality of usable logical block addresses has been formatted;

in response to determining that said particular one of said plurality of usable logical block addresses has been formatted, said disk drive controller reading data from said particular one of said plurality of usable logical block addresses to return as a response to said read command; and in response to determining that said particular one of said plurality of usable logical block addresses has not been formatted, said disk drive controller returning said initialization data as a response to said read command.

10. The apparatus according to claim 9, further comprising:

said disk drive controller determining whether said particular one of said plurality of usable logical block addresses has been formatted by reading said second indicator stored for said particular one of said plurality of usable logical block addresses.

11. The apparatus according to claim 8, further comprising:

while executing said format process, said disk drive controller receiving a command to write particular data to a particular one of said plurality of usable logical block addresses;

said disk drive controller determining whether said particular one of said plurality of usable logical block addresses has been formatted;

in response to determining that said particular one of said plurality of usable logical block addresses has been formatted, said disk drive controller writing said particular data to said particular one of said plurality of usable logical block addresses; and in response to determining that said particular one of said plurality of usable logical block addresses has not been formatted, said disk drive controller writing said particular data to said particular one of said plurality of usable logical block addresses and updating said first indicator to indicate that said usable logical block address includes real data, said second indicator for said particular one of said plurality of usable logical block addresses indicating that said particular one of said plurality of usable logical block address has not been formatted.

12. The apparatus according to claim 7, further comprising:

said disk drive controller analyzing a next one of said plurality of usable logical block addresses to be formatted;

said disk drive controller using said second indicator to determine whether said next one of said plurality of usable logical block addresses has already been formatted;

in response to determining that said next one of said plurality of usable logical block addresses has not already been formatted, said disk drive controller determining whether real data has been stored in said next one of said plurality of usable logical block addresses;

in response to determining that said next one of said plurality of usable logical block addresses has either not already been formatted or does not include real data, said disk drive controller writing said initialization data to said next one of said plurality of usable logical block addresses; and in response to determining that said next one of said plurality of usable logical block addresses has already been formatted or does include real data, said disk drive controller skipping said next one of said plurality of usable logical block addresses without writing said initialization data to said next one of said plurality of usable logical block addresses.

13. A computer program product, which is stored in a computer-readable storage medium, for permitting access to a hard disk drive, which includes a disk drive controller and physical storage media, while said storage media is being formatted, a plurality of logical block addresses being stored in said storage media, said plurality of logical block addresses including a plurality of usable logical block addresses and a plurality of defective logical block addresses, said product comprising:

instructions for receiving, by said disk drive controller from a host, a format command to execute a format process to format said storage media;

instructions for reading, by said disk drive controller, a list of said plurality of defective logical block addresses, said list of said plurality of defective logical block addresses being stored within said disk drive controller;

instructions for building, by said disk drive controller, a track layout table that makes said plurality of usable logical block addresses sequential and skips over said plurality of defective logical block addresses, said track layout table being stored within said disk drive controller;

after said track layout table has been built, instructions for returning, by said disk drive controller, a command complete response to said host before said format process has been completed and before said storage media device has been formatted, said host waiting for said command complete response before said host transmits any read or write command to said hard disk drive device;

for each one of said plurality of usable logical block addresses, and for none of said plurality of defective logical block addresses:

instructions for storing, within a write table that is stored within said disk drive controller, a first indicator that indicates whether or not said usable logical block address includes real data, real data being data that was written to said usable logical block address after said format process started executing and before said format process has been completed; and instructions for storing, within said write table, a second indicator that indicates whether or not said usable logical block address has been formatted, said usable logical block address being formatted when an initialization data is written to said usable logical block address;

first ones of said plurality of usable logical block addresses having a first indicator that indicates that said first ones of said plurality of usable logical block addresses include real data and a second indicator that indicates that said first ones of said plurality of usable logical block addresses have not been formatted, wherein said first ones of said plurality of usable logical block addresses include real data and have not been formatted; and instructions for using, by said disk drive controller, said write table to execute read and write commands transmitted to said hard disk drive from said host while said storage media is being formatted.

14. The product according to claim 13, further comprising:

in response to receiving said format command, instructions for executing said format process by storing said initialization data in second ones of said plurality of usable logical block addresses that do not include real data and have not been initialized;

after storing said initialization data in said second ones of said plurality of usable logical block addresses, instructions for updating said second indicator for each one of said second ones of said plurality of usable logical block addresses to indicate that each one of said second ones of said plurality of usable logical block addresses has been formatted;

while executing said format process, instructions for receiving a command to read a particular one of said plurality of usable logical block addresses;

instructions for determining whether said particular one of said plurality of usable logical block addresses has been formatted;

in response to determining that said particular one of said plurality of usable logical block addresses has been formatted, instructions for reading data from said particular one of said plurality of usable logical block addresses to return as a response to said read command; and in response to determining that said particular one of said plurality of usable logical block addresses has not been formatted, instructions for returning said initialization data as a response to said read command.

15. The product according to claim 14, further comprising:

while executing said format process, instructions for receiving a command to write particular data to a particular one of said plurality of usable logical block addresses;

instructions for determining whether said particular one of said plurality of usable logical block addresses has been formatted;

in response to determining that said particular one of said plurality of usable logical block addresses has been formatted, instructions for writing said particular data to said particular one of said plurality of usable logical block addresses ; and in response to determining that said particular one of said plurality of usable logical block addresses has not been formatted, instructions for writing said particular data to said particular one of said plurality of usable logical block addresses and updating said first indicator to indicate that said particular one of said plurality of usable logical block address addresses includes real data, said second indicator for said particular one of said plurality of usable logical block addresses indicating that said particular one of said plurality of usable logical block address has not been formatted.

16. The product according to claim 15, further comprising:

instructions for analyzing a next one of said plurality of usable logical block addresses to be formatted;

instructions for determining whether said next one of said plurality of usable logical block addresses has already been formatted;

in response to determining that said next one of said plurality of usable logical block addresses has not already been formatted, instructions for determining whether real data has been stored in said next one of said plurality of usable logical block addresses;

in response to determining that said next one of said plurality of usable logical block addresses has either not already been formatted or does not include real data, instructions for writing said initialization data to said next one of said plurality of usable logical block addresses ; and in response to determining that said next one of said plurality of usable logical block addresses has already been formatted or does include real data, instructions for skipping said next one of said plurality of usable logical block addresses without writing said initialization data to said next one of said plurality of usable logical block addresses.

* * * * *